Sept. 11, 1945.　　　L. LANDERS, JR　　　2,384,472
SYSTEM FOR VAPORIZING CRUDE OIL FOR USE AS A
FUEL FOR INTERNAL-COMBUSTION ENGINE AND
CONVERTER FUNCTIONABLE THEREIN
Filed Nov. 27, 1942　　　5 Sheets-Sheet 1

Fig.1.

Lovell Landers Jr.
INVENTOR

BY Edwin A. Packard
ATTORNEY

Sept. 11, 1945.  L. LANDERS, JR  2,384,472
SYSTEM FOR VAPORIZING CRUDE OIL FOR USE AS A
FUEL FOR INTERNAL-COMBUSTION ENGINE AND
CONVERTER FUNCTIONABLE THEREIN
Filed Nov. 27, 1942    5 Sheets-Sheet 4

INVENTOR
Lovell Landers Jr.
BY
ATTORNEY

Patented Sept. 11, 1945

2,384,472

UNITED STATES PATENT OFFICE 2,384,472

SYSTEM FOR VAPORIZING CRUDE OIL FOR USE AS A FUEL FOR INTERNAL-COMBUSTION ENGINES AND CONVERTERS FUNCTIONABLE THEREIN

Lovell Landers, Jr., Ossining, N. Y.

Application November 27, 1942, Serial No. 467,115

12 Claims. (Cl. 48—102)

One object of the invention is to employ liquid hydrocarbons such as crude petroleum as a basic fuel and to directly convert the same by destructive distillation or vaporization into combustible gases or vapors suitable for employment as fuel for operating an internal combustion engine or for doing other useful work.

The invention hereof revolves about a vaporizer, gas-making retort or converter particularly adapted for effecting, by the indirect application of heat, the conversion or vaporization of liquid hydrocarbon oils containing the heavy or less volatile type of liquid constituents as well as certain light or more readily volatile types of liquid constituents whereby there is realized a resulting product in gaseous or vaporous form, namely, a product or products collectively referred to herein for the purpose of identification as vapors.

Where crude petroleum or analogous heavy fraction-bearing oil is used as the basic fuel some of the light or readily volatile constituents thereof—assuming such light constituents existing therein—pass off as gases or vapors when the basic fuel is heated to temperatures within a range of approximately 160° F. As to other less readily volatile constituents which are of a character not requiring the high temperatures mentioned herein much of these will pass off as gases or vapors when the heating of the basic fuel is continued to within temperature ranges reaching up to approximately 700° F. or even up to 850° F., while for other heavier constituents a much higher degree of heating is required for the conversion into gases or vapors, namely, a heating within a range reaching up to approximately 1900° F. or even higher. A considerable percentage of the hydrocarbons is converted into the gaseous and vaporous form at temperatures within the range of approximately 850° to 1250° F.

For practical and successful operation such as is required for certain uses all of the volatilizable liquid constituents must be converted by a relatively continuous process into the gases or vapors referred to herein as vapors. In the instance of crude petroleum and of certain analogous hydrocarbon liquids there are realized as the result of the required high heat treatment solid residues some of which may be of an earthy or foreign character and certain of which are in the form of the hard coke-like product generally in the form of a type peculiar to that solid residue realized in the high temperature distillation of petroleum and sometimes identified as petroleum coke which is in the nature of coke derived from a retort of a gas works.

The gas retort, converter, or vaporizer hereof is frequently referred to herein as a vaporizer. The vaporizer hereof may be viewed as constituting the heart of the system. It is constructed so as to suitably take care of and remove therefrom coke or solid residue which would otherwise come into existence and build up to an objectionable extent therein. The vaporizer is provided with means for breaking up the hard coke and for transferring it from its place of deposit, and with means for passing the broken up or transferred coke from the interior of the vaporizer to the exterior thereof without permitting any substantial escape of gas from or the entrance of air into the vaporizer. In other words, the vaporizer embodying the features and satisfying the requirements necessary for the work intended must be of a character to produce from the oil supplied as fuel, or to convert the oil supplied as fuel, into suitable vapors proper for internal combustion engine operation and to do this in a continuous manner according to operative requirements. Moreover, as already indicated, the vaporizer must embody means or constructional features for handling this objectional coke element or residue and for transferring or passing that residue from the interior of the vaporizer whereby the operation of the latter can be carried out in a relatively continuous manner. Also in order to accomplish the required end the vaporizer must be provided with means for maintaining it in hot operating condition. The vaporizer hereof is constructed so as to provide a vaporizing space, to wit, a vaporizing chamber or chambers. It is also provided with means for spreading the liquid supplied to it, whereby there can be effected or follow a quick conversion of the liquid fuel into the vaporous or gaseous form or into the vaporous and gaseous form. As indicated the vaporizer embodies suitable means for breaking up and transferring the broken up carbon deposits to the exterior thereof. It also has means by which the resulting gases or vapors are conducted from the interior of the vaporizer thereof to an outside engine or other instrumentality using the vapors or fuel and this according to operative requirements of the vapor using instrumentality.

In the embodiment of the vaporizer shown, sets of rolls are embodied which operate over or in conjunction with fuel-receiving floor or supporting surface portions provided within the vaporizing chamber or chambers. Some of these rolls or rollers function primarily as fuel spreading rolls, as for example, in a first vaporizing chamber while other of these rolls or rollers function somewhat as spreading rolls and also as crushing rolls, as for example, in a second vaporizing chamber. These last mentioned rolls may also function as coke transferring rolls. The rolls are preferably of frustro conical formation and the desired operative steps just referred to are realized incident to the movement of said rolls along and over the underlying receiving and supporting surfaces within the vaporizing chambers.

A further aspect of the invention contemplates the employment of the vaporizer hereof in a system wherein some of the vapors from a suitable vaporizer or retort are diverted or transferred to a condenser whereby incident to a cooling of the vapors there is realized a liquid condensate which is suitable for providing a liquid type of fuel for use as a gasoline or as motor spirits, namely, as a fuel quite equivalent as to its functioning characteristics to the present-day gasoline, and in the instance of such diverted vaporous fuel, which has lost certain of the condensable constituents formerly therein, the remainder or uncondensed portion thereof continues on its way to a locality where it is mixed with and constitutes part of the non-diverted vapors that are on their way from the vaporizer to the engine.

The vaporizer as constructed for use in the system is equipped with resistance coils or wires for electrically heating the vaporizer as a step preparatory to its functioning. Such vaporizer is also constructed so as to provide a thermostatic chamber for containing therein thermostatic elements in the form of thermostatically operated units—for example typified by thermostatic bellows—that are responsive to the heat conditions of the vaporizer. One of these thermostatic units functions to control the positioning of a switch that is in series with resistance coils and which is in an electric circuit that supplies electric current for heating said coils for the starting up operation. When the thermostatic unit for this switch is cold the switch is closed. When the vaporizer is hot the thermostatic unit for this switch becomes hot and consequently opens said switch.

The system necessarily has a liquid fuel supply tank for holding the liquid hydrocarbon basic material, for example, the crude petroleum. From the supply tank there is a fuel pipe line leading from the tank to the vaporizing space within the vaporizer. This line is equipped with a main fuel throttle valve. It also has a thermostatic fuel-valve closing said line until it is automatically opened when the vaporizer is hot. The positioning of this thermostatic fuel-valve is under the control of a second thermostatic unit in said thermostatic chamber which is sometimes referred to as a bellows chamber. The main fuel pipe line is also equipped with a pressure-controlled valve for cutting down the flow area through the fuel pipe line as and when excessive pressure conditions are realized within the vaporizer, to wit, at a time when the vaporizer is producing vapors at a rate faster than necessary to meet the engine requirements. This last mentioned valve is under the operative influence of a pressure bellows element that is in constant communication with the interior of the vaporizing space.

As part of the system there is a vapor pipe line leading from the interior of the vaporizing space to a vapor-air mixing element of a carbureter for the internal combustion engine. The carbureter, as usual, has a main throttle valve. This vapor line has a vapor throttle valve. It also has a thermostatically controlled vapor-valve which is also operatively associated with a condensate or gasoline flow-control valve which is frequently hereinafter referred to as a gasoline-valve. The gasoline-valve because of its association or connection with the last mentioned vapor-valve is also thermostatically controlled. The associated valves just mentioned are under the control of a third thermostatic unit in said thermostatic chamber, whereby when the vaporizer is cold the gasoline-valve is open and the associated or connected vapor-valve is closed and vice versa when the vaporizer is hot.

The condenser mentioned has a condensate receiving tank or section wherein there is a float. There is an auxiliary vapor line leading from the vaporizing space to the condenser and also a suction pipe line leading from the condenser to the carbureter, or, as otherwise expressed, to the suction side of the engine. This auxiliary vapor line is provided with a valve controlled by the float for shutting off said auxiliary line when a substantial body of condensate, available for use as gasoline or motor spirits, has collected within the tank of the condenser. From the condenser tank a condensate or gasoline pipe line leads to a thermostatically-controlled gasoline-valve unit thence to a float chamber of the carbureter and this float chamber has a float-valve controlled communicating passageway or pipe line section leading to a gasoline-air mixing element of the carbureter. This carbureter is connected to the intake manifold or suction side of the engine and has a suitable main throttle valve therein.

In connection with the foregoing it is to be noted that the gasoline or condensate supplied is availed of for cold starting of the engine and for operating the engine until the vaporizer is hot.

In the system as described the three throttle valves, namely, the main fuel throttle valve, the vapor throttle valve and the carbureter throttle valve are connected by suitable links or equivalent mechanism for effecting simultaneous adjustment thereof by the operator, as for example, when he operates any member that corresponds in its function to the usual accelerator member.

The system preferably has other control valves or construct'onal features embodied in or in association with the vapor pipe line.

In the system shown the flow of the vapors from the vaporizing space or from a vaporizing chamber into the vapor pipe line is controlled by a flow-regulator valve operated by a metallic bellows that is in communication with the interior of the vaporizing chamber. The function of this valve is to regulate the area of the flow opening past this valve, or to close off the flow past this valve according to a pressure function of the vaporizer, to wit, whereby when the maximum pressure within the vaporizer is reached said valve is closed. This vapor pipe line is also preferably provided with an opening and an associated regulating screw which is adjustable whereby a small quantity of vapor can flow from the vaporizer into the pipe line whereby the engine may receive some vapor, as for example, when the engine is "idling."

As to the vaporizer, this is also equipped with mechanical agitation means functioning within the vaporizing space, or as otherwise expressed, within a portion thereof immediately preceding the section from which the vapors flow into the vapor pipe line.

The invention possesses objects, aspects and features of advantage, some of which with the foregoing will be set forth in the following description. In the following description and in the claims parts will be identified by specific names for convenience but they are intended to be as generic in their application to similar parts as the art will permit.

In the accompanying drawings, which constitute a part of this specification, there have been illustrated the best embodiments of the invention known to me but such embodiments are to be regarded as typical only of many possible embodiments and the invention is not limited thereto.

The novel features considered characteristic of my invention are set forth with particularity in the appended claims. The invention itself, however, both as to its organization and its method of operation together with additional objects and advantages thereof, will best be understood from the following description of the specific embodiments when read in conjunction with the accompanying drawings.

Reference is now made to the drawings in detail:

*Vaporizer*

Figure 1:
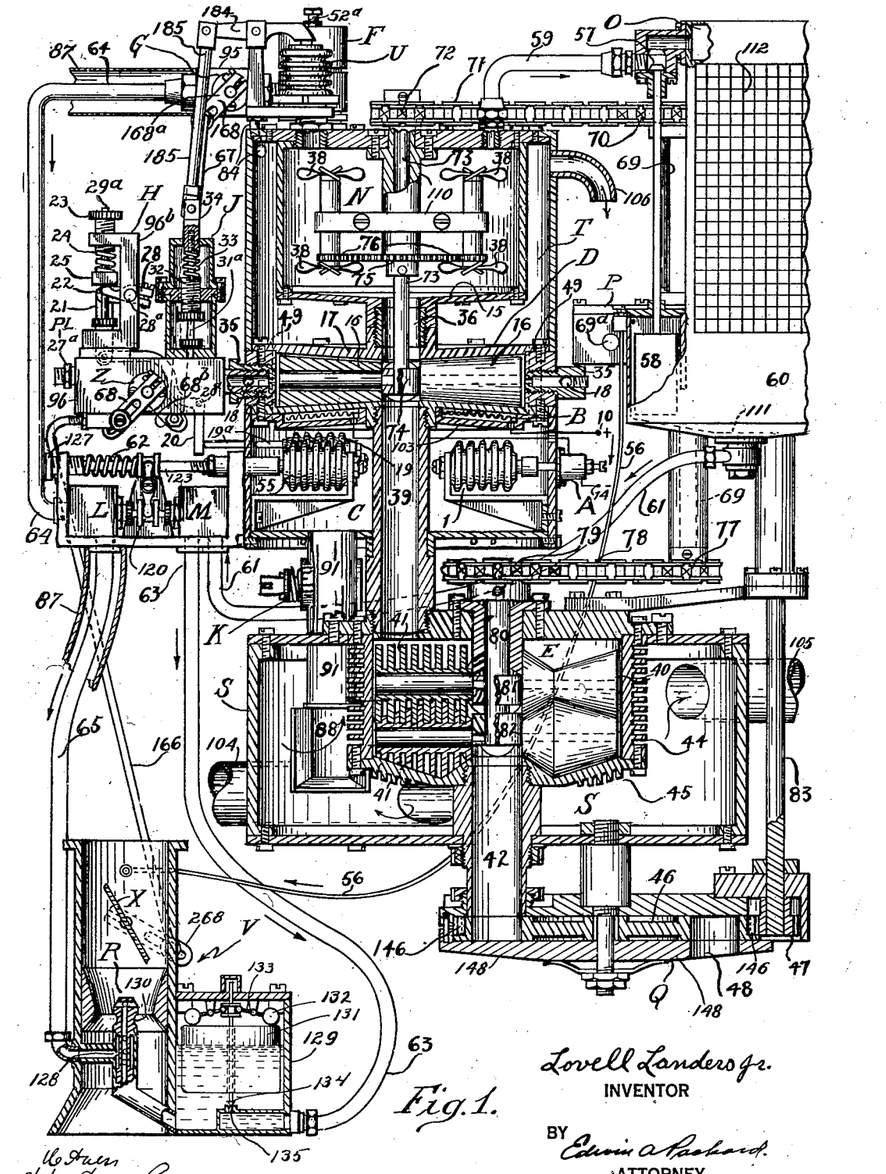
Fig. 1 is a view showing in associated relationship fundamental features, units or parts providing a system wherein and by which the invention hereof is realized; in this view a vaporizer or converter, a carburetor, and certain other parts are shown in vertical section.

As to the vaporizer which is shown in vertical section in Fig. 1, this has a body structure providing an upper or first vaporizing chamber D and a lower or second vaporizing chamber E arranged so that the lower portion of chamber D is in communication with the upper portion of chamber E through a medium of the downwardly-extending tube or throat member 39.

The body structure of the vaporizer also provides a mixing chamber N that is in communication with the upper portion of the first vaporizing chamber through an upwardly-extending tubular structure or connecting pipe 36. An outer casing structure or section provides a heating chamber S about the second vaporizing chamber E and an outer casing structure or section provides a heating chamber T about the mixing chamber N and immediately above the first vaporizing chamber D. An outer casing structure or section provides a thermostatic chamber C, sometimes referred to as a thermostatic bellows chamber, immediately below the first vaporizing chamber. Within this thermostatic bellows chamber there is a member 103 which with the bottom portion or floor member of chamber D completes a receiving space for an electrical heating unit B that includes resistance coils or wires. See wires marked 10, 11, 13 and 14 in Fig. 4.

Figure 6:
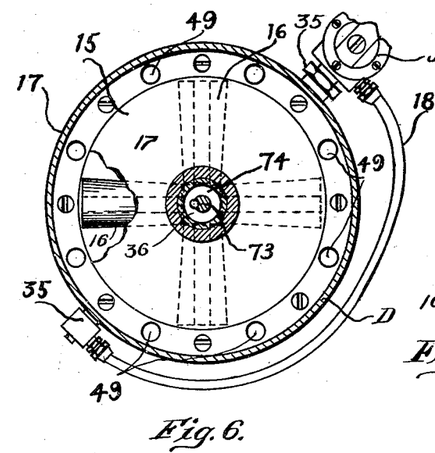
Fig. 6 shows the top of a first or upper vaporizing chamber structure and also shows a portion of the fuel feed line by which the basic operating fuel, to wit, crude petroleum, is delivered into the first vaporizing chamber. In this view certain spreading rolls and a driving spider for said rolls are indicated.
Figure 7:
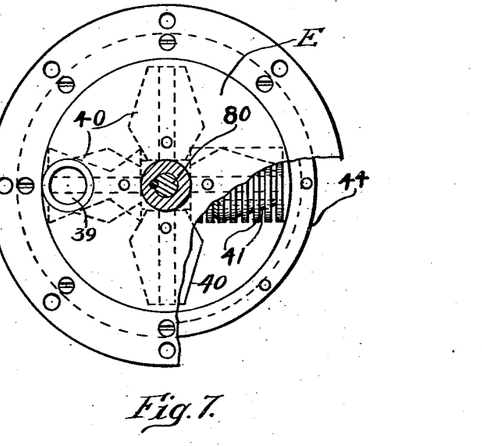
Fig. 7 shows in plan or top view a second vaporizing chamber structure or unit. In this view certain spreading and crushing rolls and driving spiders therefor are also indicated.

Before proceeding further, it will be in order to note that hot exhaust gases can be supplied to the heating chamber S by the inflow pipe 104 and that most of the same exhaust gases after having lost a substantial quantity of their sensible heat pass as cooled gases from the vaporizer casing through the outflow pipe 105. Some of the hot gases within the heating chamber S can pass into the lower open end 88 of an upflow delivery tube 91 (see Figs. 1 and 11) past an exhaust-heat regulator valve K into the bellows chamber C from which some of the hot gases pass upwardly through the holes 12 and 49 respectively of the member 103 shown in Fig. 4 and of the marginal wall portion 17 of the upper vaporizing chamber structure (see Fig. 6) thence into the uppermost heating chamber or section T from which some of the gases can leave through the pipe 106 while other portions of the gas leave through pipe 84 (see Figs. 8 and 9) for providing exterior heat for the vapor pipe line section 64 if such exterior heat is desired particularly when the system is employed in extremely cold climates.

There will later be described in detail the structure by which the basic fuel oil, such as crude petroleum, is supplied to the vaporizer. It is sufficient at this juncture to point out that such fuel oil is delivered to and through connections 35 which are in communication with each other through a side pipe 18 (see Figs. 6 and 1). The fuel delivered by these connections passes downwardly to and upon an annular upper surface or floor 15 of the upper vaporizing zone or space and it is filmed or spread by frustro conical rolls 16 mounted on laterally-extending axial portions or members of spider 74 which is horizontally turned by and about a vertically-extending axis member or shaft 73. In this first chamber some of the lighter hydrocarbons pass off as gases and rise into the mixing chamber N. The heavier or less volatile carbons pass downwardly as flowing liquid through the pipe 39 into the lower or secondary vaporizing chamber where it engages or is engaged by spreading rolls 40 and crushing rolls 41. From an inspection of Fig. 1 of the drawings, it will be noted that each roll be it a spreading roll 40 or a crushing roll 41, has turning movement about the horizontally-extending axial member upon which it is mounted and that it has bodily movement in an orbital path about a vertically-extending axis of the shaft by which the particular spider is carried and driven. The spreading rolls 40 have body portions of frustro conical formation and are of complementary configurations whereby they effectively cooperate to perform a spreading operation. The crushing rollers are serrated or have flange-like projecting elements whereby they can cooperate and also perform the desired crushing or rupturing operations on the solid residues encountered thereby. The floor portion of the secondary vaporizing section is annular in plan and in vertical cross-section the outer portion of the floor slopes downwardly and inwardly while the inner portion of the floor slopes upwardly and inwardly whereby a depression or inverted V shaped cross-section results. The upper and lower rolls of the sets 40 and 41 are mounted on laterally-extending axial portions or members of spiders 81 and 82 that are connected to and which are driven from a vertically-extending horizontally-turnable shaft 80. The shaft 73 and the shaft 80 are driven through any suitable power-actuating mechanisms, as for example, from the unit P (see Figs. 1 and 2) through the medium of a shaft 69 (a) carrying a driving sprocket 70 of an upper sprocket and chain mechanism 71 the latter of which has a driven sprocket 72 that is connected to a shaft 73 and (b) carrying a driving sprocket 77 of a lower sprocket and chain mechanism 78 the latter of which has a driven sprocket 79 connected to the shaft 80. The unit P may be viewed as a speed-reducing and power transmission mechanism and it has a shaft 69ª that drives the same from whatever motivated power means may be employed and the speed-reducing mechanism within the unit operates the shaft 70 just referred to. Through suitable means the power unit P also turns shaft 83 (see Fig. 2) and this shaft 83 in due sequence turns a pinion gear 47 which is at the lower end thereof (see Fig. 1).

In connection with the structure providing the side walls and bottom portions of the second vaporizing compartment, it will be noted that there are provided fin members 44 and 45 for facilitating the conducting of heat from the gases within the heating section S whereby substantial quantities of heat will be made available for effecting vaporization or distillation operations that are carried out or realized within the second vaporizing compartment.

Ash remover

The gear 47 is part of an ash or residue-removing mechanism sometimes referred to herein as an ash remover Q. This remover embodies the rotatable apertured disc 46 which is driven from the gear 47 that engages a peripheral gear element 146 provided on and as part of said disc. The aperture of this disc 46 provides ash-transfer openings thereto which come into successive register with the downwardly-extending ash conduit 42 and an out-of-line opening 48 in a non-turnable sealing plate 148 located immediately below the rotatable or horizontally-turnable ash disc 46. The construction just described permits the removal of ash or broken up residues such as coke from the vaporizer without permitting the ingress of air or the egress of gases or vapors from the vaporizer.

Exhaust gas tube 91

Figure 11:
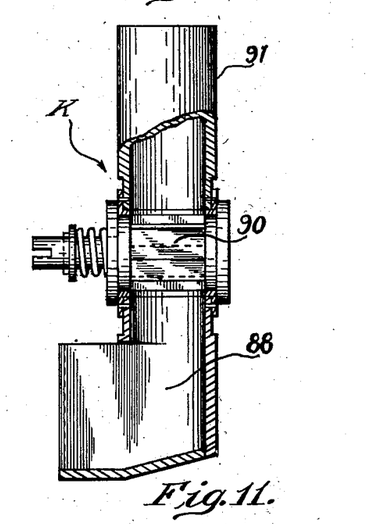
Fig. 11 shows a detail of an exhaust heat regulator valve embodied in a conduit construction provided for conducting hot gases from a heating casing about the lower or second vaporizing chamber or unit to or towards a heating casing structure about the upper or first vaporizing chamber or unit.

The exhaust gas delivery tube 91 shown in Fig. 11 has therein an exhaust heat regulator valve K. This valve K is provided by a butterfly valve 90 which is adjustable for regulating the upflow of gas from the lower heating chamber section S into the bellows compartment C and therefrom into the heating section T. This upflow of gas may be viewed as a portion of the heating gases which are diverted from the main flow which passes into the heating section S from the intake pipe 104 thereof and which main portion of the gases leaves that heating section through the outflow pipe 105 thereof.

Mixing chamber

In the mixing chamber N there is a bearing and supporting member 110 which provides the bearing for the shaft 73 heretofore mentioned and also bearings for rotary bladed mixing elements 38 which are actuated from the shaft 73 by suitable means such as a sprocket and chain mechanism indicated at 76.

The gases or vapors which pass upwardly from the second vaporizing chamber through the pipe 39 and which mingle to a certain extent with the vapors or gases given off from the upper or first vaporizing chamber D pass through the upflow portion 36 into the mixing chamber N whereat incident to the functioning of the mixing mechanism just referred to these several vapors and gases are intimately mixed and mingled whereby a relatively uniform and homogeneous mixture is realized.

The gases or vapors from this mixing chamber, except such as may be diverted and sucked into the condenser O as is explained herein, pass into a vapor pipe line leading to a vapor-air mixing element of a carbureter.

Figure 8:
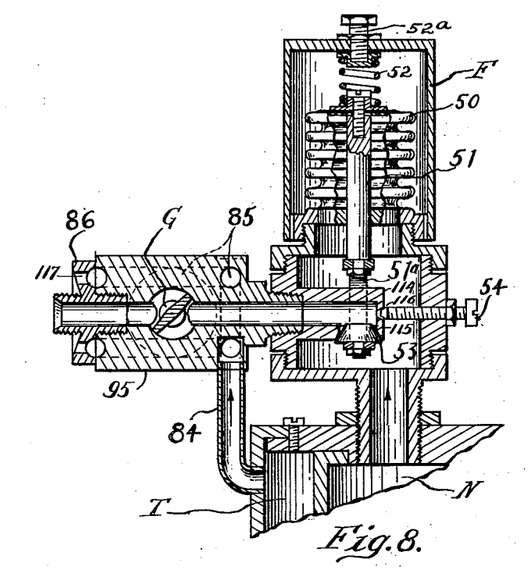
Figs. 8 and 9 show in detail a flow-regulating valve and a throttle valve both of which valves are incorporated in or are part of a main vapor pipe line leading from the vaporizer. The throttle valve is embodied in a design whereby it may be heated by the exhaust gases from an internal combustion engine particularly when the apparatus is to be used in low temperatures.
Figure 9:
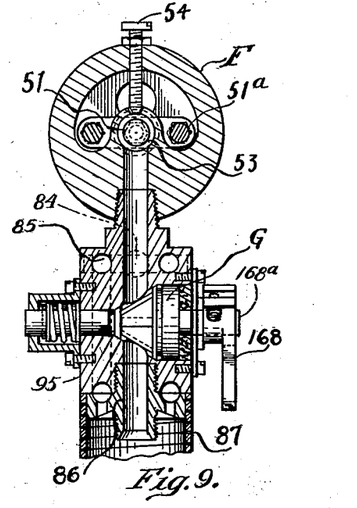

The vapor line just referred to comprises pipe sections 64 and 65 (see Figs. 1 and 2) and at the inflow end of this pipe line there is employed or embodied the structure shown in cross-section in Fig. 8 and further amplified as to disclosure by Fig. 9. The structure of these figures includes a vapor throttle valve G and a vapor flow-regulator valve mechanism or unit F. The vapor line also includes or embodies a thermostatically-controlled vapor valve unit L (see Fig. 1). The details and elements of construction of this vapor valve unit and of the pipe line embodying the same will later be referred to.

Auxiliary vapor pipe line and condenser

From the mixing chamber N there also extends an auxiliary vapor line 59 leading to a condenser O. The diverted flow through this auxiliary vapor line 59 is controlled by a valve 57 operated by a float 58 in a condensate storage space or condensate receiving section 111 of condenser tank 60. This condenser is, of course, provided with suitable cooling members or cells collectively designated as 112. The condensate which collects in this section 111 is suitable for functioning as motor spirits resembling gasoline and therefore is frequently referred to herein as gasoline.

Carburetor

The system has a carburetor designated V. This carburetor is indicated partially in Fig. 1. The carburetor embodies the usual float chamber 129 in which there is operatively positioned a float and an associated fuel valve controlled thereby and which according to operative conditions and height of the liquid fuel in that chamber, permits a flow of fuel such as the condensate or gasoline past the float-controlled valve into the float chamber 129 and therefrom into a gasoline-air or condensate-air mixing element 130, to wit, into a gasoline-air mixing element substantially like that of the ordinary air-fuel mixing element provided by the usual carburetor jet member R. The carburetor also has a vapor line (see vapor pipe line section 65) leading to a vapor-air mixing element 128 thereof which is in fact embodied in or by the carburetor jet member R. The carburetor also has a main throttle valve X for controlling the amount of mixture passing from the carburetor into the intake manifold and in this connection it will be noted that the carburetor, when in place, is connected to the intake manifold of an internal combustion engine in the usual manner. The carburetor also has connected thereto and leading thereinto a vacuum or suction pipe 56 by which the condenser O of the system is placed under vacuum or reduced air pressure and also whereby any uncondensed vapors collecting in the condenser can also pass therefrom through this vacuum pipe 56 into the carburetor or what is the same thing, into the intake manifold or intake section of the engine.

Main fuel supply line

Figure 10:
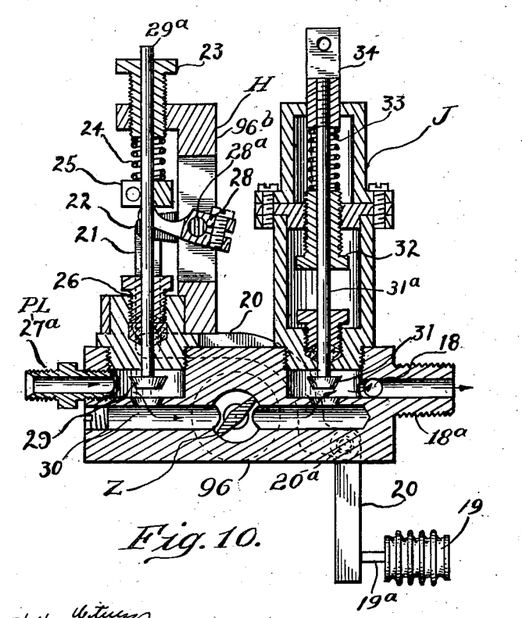
Fig. 10 shows a detail of a thermostatically-controlled valve, a throttle valve and a pressure control valve, all of which are embodied in or provide for a main liquid fuel supply line leading to the vaporizer.

For this line there is a normally closed fuel tank that receives the liquid hydrocarbons such as crude petroleum which is to be employed as the main fuel and this tank is either under a pressure or at sufficient elevation whereby there will be a consequential flow of basic liquid fuel from the tank into the vaporizer when the valves in a pipe line leading from that tank to the vaporizer permit such flow to take place. This pipe line generally designated as PL has a pipe section 27 and a threaded pipe member or connecting nipple 27ª (see Figs. 2 and 10) leading to a casing or body member 96. This body member 96 has valve-controlled passageways therethrough and in this connection note passageway 30 having a butterfly type of throttle valve Z therein. Because of the particular mechanical construction employed one end of this passageway 30 is closed by a screw plug. The body member 96 terminates in a threaded section 18ª that is connected to a fuel delivery member 35 of the pipe line (see Figs. 2 and 10). There are a plurality of members 35 connected as by pipe 18 and by the apertured threaded section 18ª whereby the fuel oil is delivered to the members 35 and from these members 35 into the vaporizing chamber D. This fuel pipe line PL (see Fig. 13 as well as Fig. 10) therefore has the throttle valve Z referred to. This throttle valve Z is sometimes referred to as a fuel control throttle valve or as the main fuel line throttle valve.

The fuel line PL also has associated therewith a thermostatically-controlled fuel valve unit H and a pressure-controlled fuel valve unit J. The valve units H and J just referred to employ the body member 96 as part thereof. The thermostatically-controlled fuel valve unit H has a valve member 29 (see Fig. 10) at lower end of the movable valve rod, spindle or stem 29ª which is pressed to closed position by spring 24, the pressure of which is adjusted by nut 23. The lower end of this spring is seated on a clamping member 25 secured on stem 29ª. This valve 29, however, is susceptible to being opened by a thermostatically-controlled mechanism having a rocker arm 28 on shaft 28ª which is turnably mounted on a bracket 96ᵇ. On a portion of shaft 28ª there is a rocker arm 22. The free or movable end of arm 22 is operatively associated with the thermostatic element or bellows 19 (see Fig. 5) through the medium of a link 21 and a lever 20 fulcrumed at 20ª (see Fig. 10), which lever is operated from bellows 19 by a member 19ª that engages this lower movable end of the lever (see Figs. 1 and 5). As the bellows 19 expands due to hot conditions of the vaporizer it effects movement of this lever 20, links 21, rocker arm 22, shaft 28ª, rocker arm 28 and clamp 25, the latter of which is on the valve stem or spindle 29ª thereby functioning to move the fuel valve 29 to open position whereby oil can flow past that valve if the other valves of this pipe line are in position to allow such flow to take place. The pressure-controlled valve unit J comprises a valve 31 that is always open except when closed incident to pressure conditions within the vaporizer. This valve is at the lower end of a rod, stem or spindle 31ª which is normally pushed upwardly by spring 33, one end of which spring engages the lower end of an adjustable screw cap 34 while the other or lower end of the spring is supported and adjusted as to pressure by nut 32 through which the valve stem 31ª is otherwise free to move. The upper end of the screw cap member 34 is connected to the lower end of a link 186 as shown in Fig. 1. The upper end of this link 186 is connected to one end of a lever 184 which is supported on a member stationary with respect to a vaporizer and the other end of this lever 184 engages the upper end of a pressure bellows U that is in constant communication with the upper interior portion of the mixing element N.

The construction just described is such that when the pressure within the vaporizer rises substantially above that required for the normal engine operation the pressure bellows U expands and through the medium of the lever 184 and link 185 functions to press downwardly the screw cap 34 and thereby the valve stem 31ª and valve 31 at the lower end of the latter into position for restricting or closing the passageway through the crude oil line whereby the supply of oil to the vaporizer will be materially cut down or completely cut off according to the position of the valve 31 and all of this even though the main fuel throttle valve Z may be in open position.

Vapor delivery line

The vapor pipe line, which comprises pipe sections such as 64 and 65, receives the vapor from the mixing chamber or compartment N of the vaporizer through a flow-regulating valve unit F shown in Figs. 8 and 9. This unit F has a casing structure providing a passageway therethrough and an associated pressure-operated bellows 50 to which there is connected for actuation thereby a valve-carrying element 51 having at the lower end thereof a valve 53 which is operatively disposed with respect to a valve-controlled passageway or opening 115 provided within the casing. This valve 53 is below, viz. away from closing position for the apertured portion or opening 115 controlled thereby at all times except when raised incident to the expansion of the bellows 50 according to pressure conditions in the vaporizer. An adjustment as to the operating conditions of this valve under the influence of the pressure bellows is effected by a spring 52 which is adjustable as to the pressure exerted thereby because of the screw mechanism indicated at 52ª. The lower end of the member 51 is in the form of a yoke 51ᵃ straddling the passageway structure or member 114 which provides the apertured portion or flow opening 115 that is controlled as to the passage area therethrough, or which is closed, by the valve 53. This valve 53 is in fact carried by and at the lower end of this yoke portion. The member 114 just referred to also has an opening 116 and there is associated therewith an adjustable screw 54 which can be positioned so as to leave a constantly open adjusted area for the passage of a restricted or small amount of vapors from the chamber N through the opening 116 into the vapor pipe line or section 114 thereof even though the valve 53 were in closed position. The vapor pipe line also has a casing member or block 95 having an aperture therethrough constituting a portion of the vapor pipe line and this block is provided with the vapor line throttle valve G (see Figs. 8 and 9) which normally effectively controls the passage of vapor flowing through the vapor pipe line. This valve G has a stem 168ª which is actuated through the medium of lever 168. This block 95 has flow passages 85 therethrough that are in communication with a pipe 84 whereby partially cooled exhaust gases from the heating chamber T can be employed for heating the block 95 and for supplying heat within a tubular structure surrounding a vapor pipe section such as 64. A special connection has therefore been provided at 86 whereby the pipe section 64 can be connected to the block and whereby there are provided passageways such as 117 through which the exhaust gases can continue to flow from the block into a flexible tubing 87 that surrounds the vapor tube section 64 whereby in relatively cold climates hot gases flowing through the tubing 87 can be employed to hold the vapors against undue cooling in the pipe 64.

This vapor pipe section 64 leads to and is connected to the thermostatically-controlled vapor valve unit L (see Figs. 1, 2, 12 and 13) which constitutes part of a composite valve element 120 having a thermostatically-controlled vapor valve 121 and a thermostatically-controlled gasoline or condensate valve 122. These valves 121 and 122 are connected and positioned relative to orifice valve seat members associated therewith so that when the vapor valve 121 is moved to valve closing position with respect to its seat member the gasoline or condensate valve 122 is in open position with respect to its seat member and vice versa. These associated valves 121 and 122 of the composite valve element 120 are under the control of the thermostatic bellows or unit 55 through the medium of a rod 123 having a grooved collar 124 that engages the upper end of a pivoted lever 125, the lower end of which lever has engagement with a grooved collar 126 on the member 120 providing the composite valve elements 120.

In said Figs. 1, 2, 12 and 13 it will be noted that there is also a spring 62 the compression effect of which can be regulated by an adjustment nut 127. This spring 62 operates in opposition to the functioning of the thermostatic element or bellows 55 whereby the desired degree of operative movement for the composite valve structure can be regulated. From the thermostatically-controlled vapor valve unit L a vapor pipe line section 65 extends to a vapor air-mixing element 128 of carbureter V. The air-mixing element just referred to is provided by a jet R which may be a part of a standard carbureter construction.

*Condensate or gasoline line*

A condensate or gasoline pipe line section 61 leads from the condensate section 111 to unit M (see Fig. 1) herein referred to as a thermostatically-controlled gasoline valve unit and from this unit a further section 63 of the gasoline line leads to a float chamber 129 of a carbureter. The gasoline flows from the float chamber past a float-controlled valve provided for such chamber, and is sucked into a gasoline-air mixing element 130 provided in the carbureter designated V. When the thermostatically-controlled gasoline valve 122 of the unit M is open the gasoline or condensate can flow from the pipe line section 61 past said valve 122 into and through the gasoline or condensate pipe line section 63 leading to and into the float chamber 129 of the carbureter. When and as the level of the gasoline or condensate in chamber 129 falls it allows the float 131 to drop and also the counter weights 132 to correspondingly drop whereby through the medium of pivotally mounted levers 133 the valve 134 is lifted from its seat 135 allowing the gasoline or condensate to flow into the float chamber 129 and therefrom into the gasoline or condensate-air mixing element at 130. This air-mixing element 130 may be viewed as constituting part of the jet R of a standard carbureter. The carbureter, when in operative position, is attached to the intake manifold of a gas engine and in order that the condenser may be placed under suction, as the engine operates, there extends from the interior of the condenser a suction or vacuum pipe line 56 leading to the main passageway of the carbureter V, or as otherwise expressed, leading to the intake manifold of the engine whereby as vapor-air mixtures are sucked into the engine there is created sufficient reduced pressure or vacuum within the interior of the mixing chamber N whereby gases or vapors (within the interior of the mixing chamber N) will be sucked through the auxiliary vapor pipe line 59 past the valve 57, when the valve 57 is open, into the condenser O. This condenser functions to condense from the gases or vapors supplied thereto such constituents as will readily liquefy thereby providing the gasoline or condensate required or available for a starting-up operation and the arrangement of the suction pipe 56 is such that while this condensing is taking place the uncondensed portion of the vapors within the condenser becomes available as fuel which passes from the condenser into the suction line 56 and thence to a locality whereat they are delivered and ultimately pass as vapor fuel into the intake manifold of the engine.

*Thermostatically-controlled electric switch A*

Figure 3:
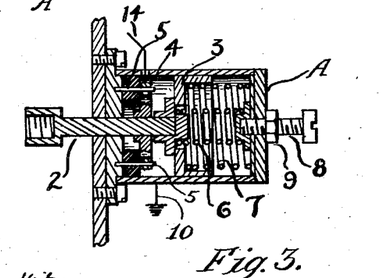
Fig. 3 shows in detail a thermostatically-operated electric switch for controlling the flow of electric current to a heating unit or resistance coils for heating the vaporizer.
Figure 5:
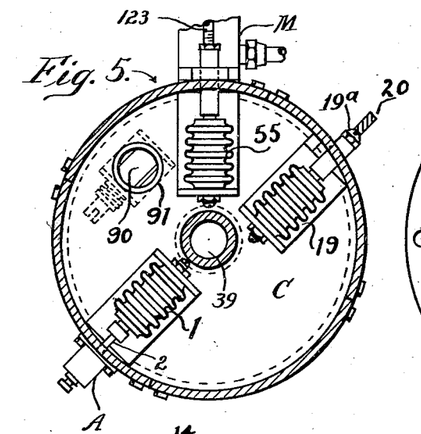
Fig. 5 shows the arrangement of three thermostatic units in the form of thermostatic bellows disposed in the thermostatic chamber section of the vaporizer and of which bellows one operates the opening of the thermostatically-controlled electric switch of Fig. 3, and another operates to open a valve in the fuel oil feed line leading to the vaporizer while another functions to control the positioning of a set of associated valves of which one valve controls a condensate or gasoline feed line leading towards a carburetor while the other valve controls a main vapor pipe line leading from the interior of the vaporizer to the carburetor.

This switch includes suitable casing structures and has a spindle, rod, or stem member 2 directly associated with and connected to the thermostatic unit or element 1 as is apparent from an inspection of Figs. 3 and 5. The thermostatic element is shown in the form of a thermostatic bellows but it will be manifest that any suitable form of thermostatic element or unit can be employed. This switch is constructed so that a movable contact member 4 thereof closes a circuit through contact pins 5 whereby a circuit is completed that includes the heating elements or wires 10, 11, 13 and 14 of an electrical heating unit B. In this connection it will be pointed out that other portions of this circuit must embody the source of electric power whereby electrical energy is available for the heating elements or resistance wires of the heating unit B. The construction employed may be viewed as a shunt circuit or as an auxiliary circuit normally completed only when the contact 4 completes the circuit through contact members 5. The spring members 6 and 7 and the slidable guide head 3 function to effect the closing movement of this contact member 4 to closing position but these springs and the cross-head have retrograde movement from the switch closing position when the thermostatic element 1 is heated sufficiently to effect a movement of the stem member 2 against the pressure of the springs and whereby the circuit that includes the movable contact 4 is broken incident to the movement of the member 4 from closing or engaging position with respect to the contact pins 5. This breaking of this shunt circuit is effected when the vaporizer is in hot operating condition, otherwise the heating coils are in circuit for heating the vaporizer when the main circuit from which this shunt circuit derives its electrical energy is completed for engine operation.

*Electric heating unit B*

Figure 4:
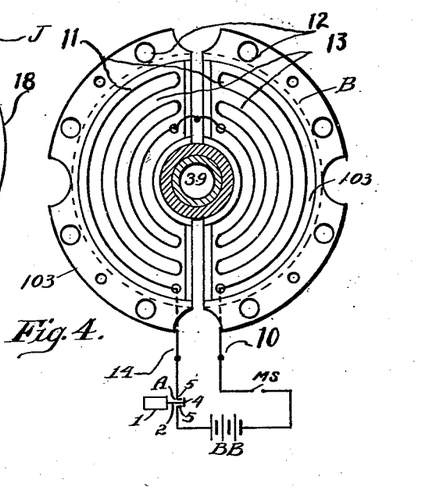
Fig. 4 shows a plan view indicating how the heating unit or resistance coils just referred to are incorporated in the vaporizer.

With respect to the heating coils or wires shown in Fig. 4, it will be noted that a battery or other electric means BB is indicated for serving as a suitable source for the electrical energy which is employed in the electric circuit that includes the resistance wires 10, 11, 13 and 14 of the heating element, the contacts 4 and 5 of the thermostatic electric switch A, and the contacts of main switch MS. In this circuit the closing of the main switch MS supplies electric current to the resistance wires or coils of the heating element, assuming the vaporizer is cold whereby switch A is closed. The main switch MS may be a main closure switch of an electrical ignition system.

When the main switch MS is closed and when the thermostatic element or bellows 1 is contracted because of a relatively cold condition thereof whereby an electric circuit is completed through switch A the electrical energy is supplied to the resistance coils or wires of the heating unit whereby heat is supplied to the bottom of the first vaporizing chamber D and to the rolls 16 within that chamber.

According to the heated condition of the vaporizing chamber structure there is controlled the operation of the thermostatic elements or units 19, 15 and 1 within the bellows chamber D.

When the proper temperature of that chamber has been reached and when the vaporizer has reached proper vaporizing conditions then the thermostatic element 1 due to expansion thereof causes the movable contact 4 to dis-engage the contact pins 5 thus breaking the electric circuit. In this connection it will be noted that the expansion of thermostatic element 1 causes a movement of the contact member 4 from the pins against the opposing pressure of springs 6 and 7. In this connection it will be noted that the opposing pressure of spring 6 of the thermostatic electric switch A can be regulated by positioning a screw 8 which is normally locked in position by nut 9.

*General*

Reference has heretofore been made to the fuel oil throttle valve Z to the vapor line throttle valve G and to the carbureter throttle valve X. The fuel throttle valve Z has actuating levers 68 and 68ᵇ therefor, the vapor throttle valve G has an actuating lever 168 therefor and the carbureter throttle valve X has an actuating lever 268 therefor. The levers 68ᵇ and 168 are connected by an operating link 67 and the levers 68 and 268 are connected by an operating link 166 whereby as one of these throttle valves is actuated the other throttle valves are correspondingly actuated. Of course, some suitable type of adjusting mechanism is preferably provided in or for these levers or links whereby the operative effect of each can be adjusted or as otherwise expressed whereby the relative position and operative movements of the different parts controlled or positioned thereby can be adjustably regulated. The levers just referred to are preferably constructed whereby the position of these connecting links relative to the axes of the levers can be adjusted.

Mention has heretofore been made that the basic fuel such as crude oil is normally preferably under pressure whereby oil will flow from the main tank MT thereof through the main fuel pipe line, assuming that the valves thereof are in position to permit such flow, into the vaporizer. Means for placing this tank under pressure is broadly indicated by PM in the diagrammatic Fig. 13. Manifestly this tank must have suitable closure means whereby the required basic fuel can be introduced into the tank.

*Operation*

Figures 2, 12:
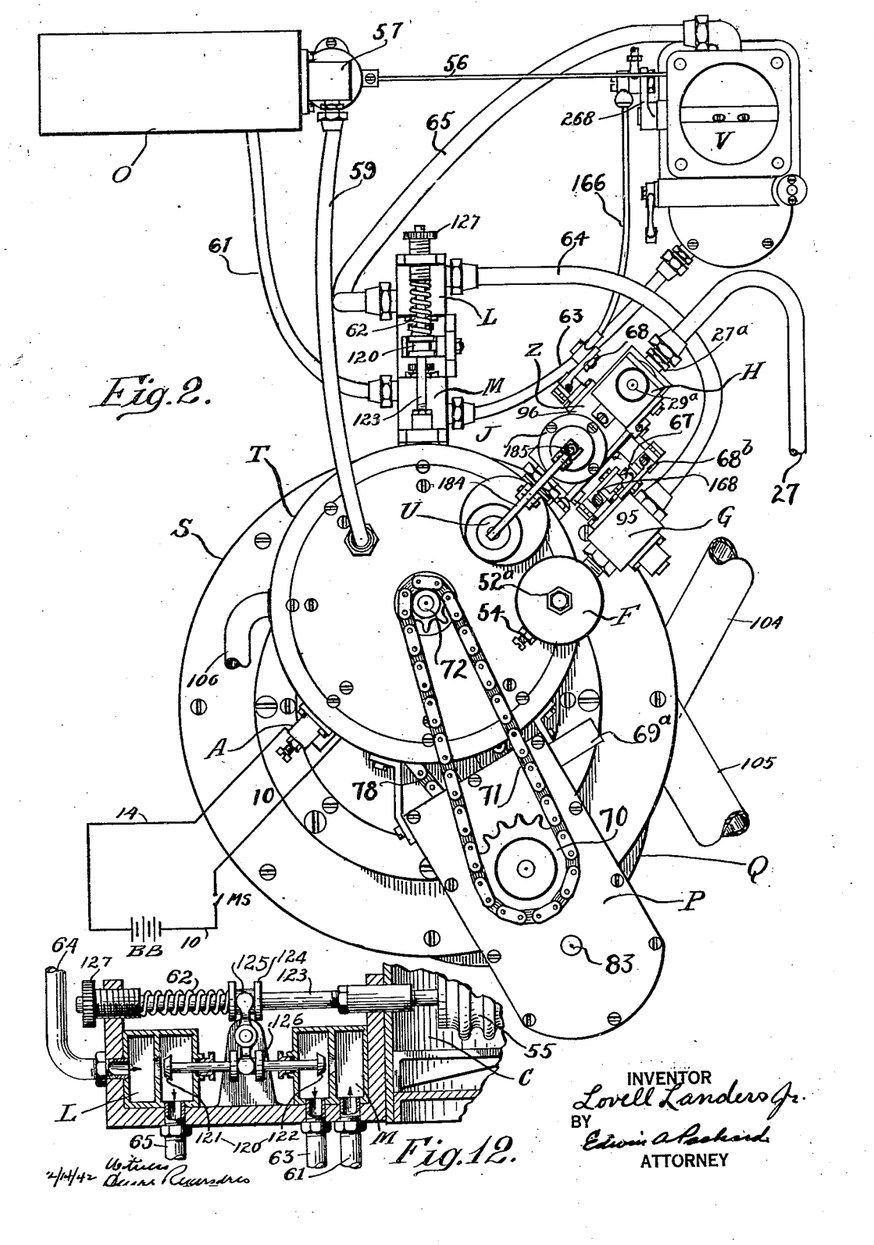
Fig. 2 is a top or plan view of the vaporizer and system of Fig. 1.
Fig. 12 is a view partially in vertical section of a thermostatically-controlled combined vapor and gasoline valve construction.
Figure 13:
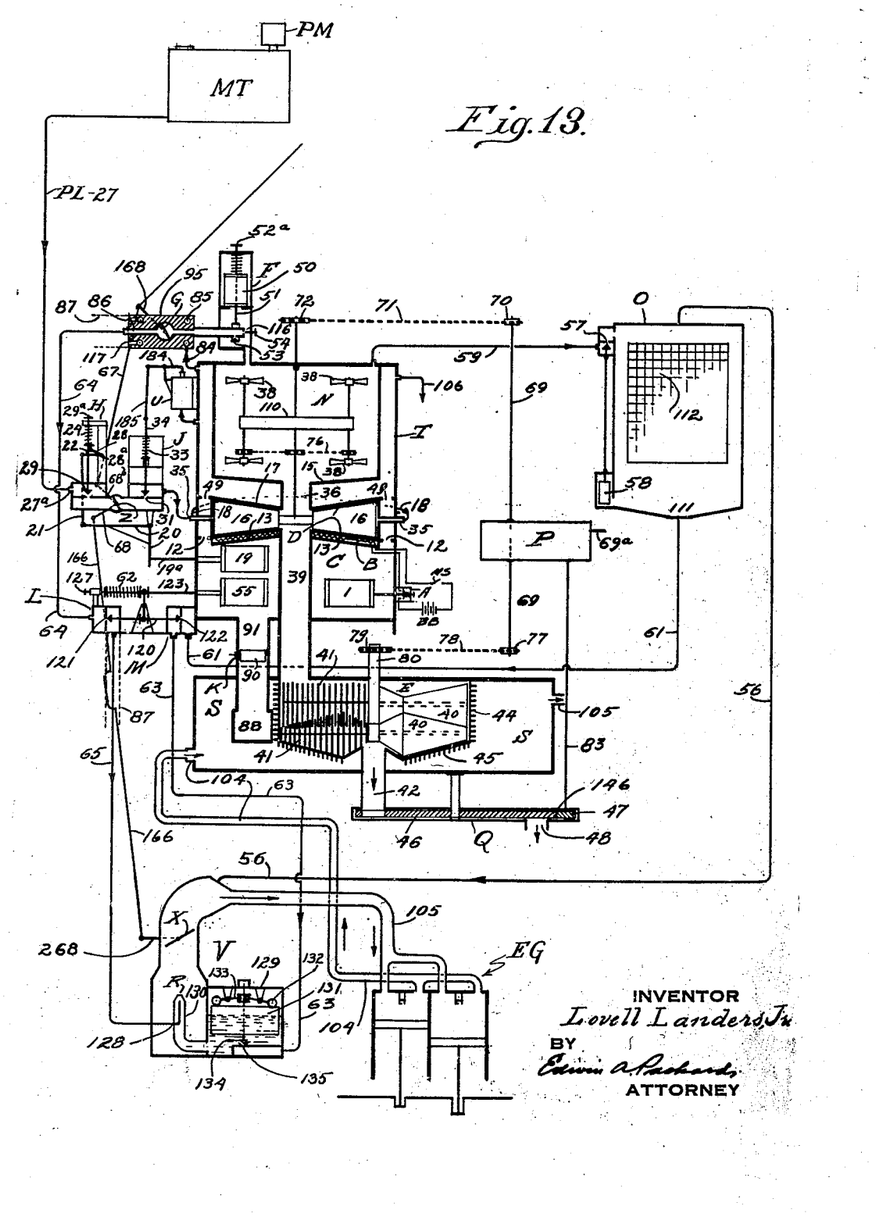
Fig. 13 is a view diagrammatically illustrating the system in which the vaporizer and the several operative parts or units of the system are brought into operative arrangement and relationship whereby an internal combustion engine may be operated in a practical and feasible manner from liquid fuels such as crude petroleum.

Starting with the condition in which the converter is cold, when the operator of the motor to which the vaporizer is attached turns on the main switch of the ignition system, the liquid fuel, to wit, the gasoline or condensate stored in the condensate storage section 111 of the condenser O (see Figs. 1 and 2 and Fig. 13) is fed to the motor through the gasoline or condensate line that includes gasoline pipe section 61, the thermostatically-controlled gasoline valve unit M which is open, and the gasoline pipe section 63 to the carburetor float chamber 129 (see Figs. 1, 2 and 13). From the float chamber 129 the gasoline or condensate passes the float control valve of said chamber to the gasoline or condensate-air mixing element or section 130 of the carbureter. The use of the condensate for starting is substantially the same as the use of gasoline as commonly employed in starting and operating an automobile internal combustion engine.

The ignition switch of an automobile engine system may function as the main switch MS of the circuit of Fig. 4. At the starting up of the system when the vaporizer is cold and the switch A is closed the electric or battery circuit shown in Fig.

4 is completed by closing main switch MS and thereby there follows the supplying of electric current to the heating unit B (see Figs. 1 and 4) whereby the electrically heated elements thereof, to wit, the resistance wires or coils 10, 11, 13 and 14 thereof supply heat to the underside or floor portion of the vaporizing chamber D and also to the thermostatic chamber C wherein there is located (a) the thermostatic unit or bellows 1 for controlling the opening of the electric switch A, (b) the thermostatic unit or bellows 19 for actuating the thermostatic fuel valve H to affect opening of the valve of that unit when the vaporizer is hot, and (c) the thermostatic unit or bellows 55 which functions to move the gasoline or condensate valve of unit M towards closing position therefor and to move the associated vapor valve of unit L from closed position therefor as and when the vaporizer approaches and reaches hot operating condition, or to move the two associated valves just referred to in a reverse direction incident to a substantial cooling of the vaporizer.

Normally when the throttle valve Z is open and when the thermostatically-controlled valve of unit H is open because of the vaporizer being hot, then the pressure-controlled fuel valve of unit J is open and the fuel can flow from the liquid-holding tank past valves into the discharge orifices or nipples 35 and therefrom into the vaporizing chamber D whereby the fuel oil can be distributed over the floor of the vaporizing chamber and whereby the delivered oil can be further filmed by the operation of the rolls 16 in said chamber. This flow into the vaporizer under the conditions just mentioned can continue except when there is an excess pressure or undue accumulation of vapors within the vaporizer and in such instance the pressure-controlled valve of unit J, which valve is under the control of the pressure-actuated metallic bellows U, is automatically closed whereby the flow of fuel oil into the vaporizer is suspended during the period of abnormal high pressure conditions within the vaporizer.

Assuming a condition of cold starting, it will be noted that when the temperature within the thermostatic chamber C rises so as to be within an approximate range of 195° to 212° F. then the expansion of thermostatic unit or element 19 starts to effect an opening of the thermostatically-controlled fuel valve 29 of unit H. This expansion of unit 19 is directly transmitted to the lower end of the lever 20 (see Figs. 1 and 10). The lower end of lever 20 is thus forced to the left by the thermostatic unit 19 and the entire lever which is pivoted or fulcrumed at 20ᵃ moves clockwise, thus moving upwardly the link 21, the lever arm 22, the shaft 28ᵃ and the lever arm 28 in a manner whereby the free end of the latter engages the clamp 25 that is on the spindle 29ᵃ of the valve 29 and whereby the valve is consequently moved upwardly to open position against the pressure of spring 24.

From that which has preceded in the detailed description, it will be noted that the valve of unit J is always open except when it is closed during the excessive or abnormal pressure conditions within the vaporizer, namely, through the functioning of the pressure-actuated bellows U, the lever 184 and the link 185 that is pivotally connected to the member 34 on the spindle of valve 31, whereby this valve can be pressed downwardly towards closed position against the action of the spring 33 incident to the expansion of the pressure bellows U.

Also from the detailed description which has preceded, it will be recalled that the system employing the vaporizer has three throttle valves, namely, the fuel oil throttle valve Z, the carbureter throttle valve X and the vapor line throttle valve G, all of which are connected through mechanisms that include links 66 and 67, whereby they move in unison. The system employing these valves is installed in association with an accelerator whereby they are under the control of the operator as through a usual accelerator mechanism and in the normal functioning of the machine the fuel throttle valve Z is opened an amount proportional to the fuel or crude oil requirements.

As the vaporizer functions the oil supplied to the vaporizer chamber D is filmed or spread relatively thin whereby the lighter fractions are readily released and rise within the vaporizer and the heavier fractions or unvaporized portions of the oil pass downwardly, viz., gravitate through the conduit section 39 into hotter lower chamber E. In the chamber E the heavier and remaining volatilizable fractions are converted into gases or vapors that pass upwardly through the conduits 39 and 36 into the mixing chamber N wherein incident to the functioning of the bladed mixing elements 38 the gases or vapors from both of the vaporizing chambers are intimately intermingled or mixed, thereby producing a relatively uniform vaporous product referred to as "vapors" which are supplied to the carbureter through the vapor line that includes the pipe sections 64 and 65. At this juncture it will be remembered that the vaporizer is maintained in a heated condition by the hot exhaust gases from the engine, which gases flow through the intake 104 into the lower heating chamber S and from which some of the hot gases pass outwardly through pipe 105, while a controlled quantity of the hot gases from this lower heating chamber pass upwardly through the gas-delivery tube 91 into the thermostatic chamber C and therefrom through openings 12 and 49 of the housing or casing structure of the vaporizing chamber D into a heating chamber T surrounding the mixing chamber N. From this chamber T some of these hot gases can pass upwardly through the pipe 106 and some of them can also pass through the pipe 84 (see Fig. 8) whereby they may be made available for supplying heat about the vapor line that includes pipe sections 64 and 65, particularly where the system is to be used in extremely cold climates. As the apparatus functions the vaporizing chamber D soon takes on its normally operative hot condition therefor. The temperature therein can be made to vary according to operating conditions, but it in general will function at temperatures probably not exceeding 700° F. In the lower chamber the temperature is considerably higher and the temperature here may range from 900° F. to 1200° F., or even considerably higher than that, even up to a range approximating 1950° F. In this lower chamber the temperature must be high enough to effect the volatilization of the heavier liquid hydrocarbons and in this operation there will be experienced a residue approaching in form that of coke. The residue may also include foreign solids particularly where the fuel oil is of a crude or unrefined type. For this reason provision has been made for crushing and breaking up any resulting residue by means of the rolls having a configuration particularly adapted for the purpose. The rolls can also function to effect a transfer of the residue so that it will pass to and ultimately downwardly through ash conduit 42 into a receiving opening of a rotatable apertured disc 46 whereby incident to the turning of the disc the ash or residue in said opening can be transferred to a locality whereby it can drop through another out of line opening 48. The mode of transferring or delivering of ash residue from the lower chamber E through the medium of the rotatable apertured disc effects such transfer of residue to a locality outside of the vaporizer without permitting the escape of any substantial amount of gas from the vaporizer, or of any substantial amount of air into the vaporizer.

Assuming the engine has been started up by the gasoline or condensate and the vaporizer is in hot condition, the flow of vaporized fuel from the mixing chamber N passes the valve 53 of the flow regulator valve F (see Fig. 8) into the block 95 having a vapor flow passageway therein that is controlled by vapor throttle valve G, thence into vapor pipe section 64, through thermostatically-controlled vapor valve unit L and pipe section 65 to the vapor air mixing section 128 of the carbureter V whereby the vapor thus supplied to the carbureter of the vapor-air mixture passing therefrom can be sucked into the intake manifold of the engine and is thus available for operating the hydrocarbon engine.

Mention has heretofore been made that the starting of the engine was by condensate or gasoline derived from the process or from the operation of the system of which the vaporizer constitutes a part. As already indicated the procuring of this gasoline or condensate is from diverted vapors, passing under the influence of engine suction through the auxiliary pipe 59, thence past a float control valve 57 into the condenser O wherein the condensable constituents thereof are cooled for thereby providing a liquid condensate which serves as motor spirits and which are herein referred to as gasoline. This condensate or gasoline collects in a storage section 111 of the condensate tank 60. This collecting is during the normal operation of the engine, to wit, during a period when the engine is running on vapors. The liquid condensate or gasoline is allowed to accumulate until a sufficient quantity thereof has been acquired whereby a float 50 in the condensate tank rises to close the valve 57 and thereby shut off further diversion of vapors from the mixing chamber N through the pipe 59 leading to the condenser O. During engine operation the condenser is under suction, to wit, under reduced pressure or vacuum conditions because of pipe line 56 leading from the interior of the condenser and connected to either the carbureter or to the intake manifold of the engine. Through this pipe 56 there is passed from the condenser to the engine uncondensed portions of vapors.

The condensate procured as just described is suitable for use as gasoline or motor spirits for starting the engine at times when the vaporizer is not in hot condition. As to operation of the rolls within the vaporizer and as to the means for actuating the apertured disc of the ash remover Q, this can be taken care of by any suitable mechanism. This mechanism may be operated by an electric motor or flexible shaft from any suitable motivated power which will naturally employ speed reducing and power transmission mechanisms.

Many advantages of the apparatus, system or device constituting the basis of this invention may be pointed out. In this connection it will be noted:

(1) That the apparatus can be installed on a gasoline or hydrocarbon engine without mechanical change, except that the carbureter means must be adapted to it;

(2) That the fire hazard attendant upon hauling and having present large quantities of gasoline in planes or tanks is eliminated;

(3) That the mileage per gallon of crude oil can be substantially increased over the mileage available from gasoline produced from the same amount of crude oil and used in the same engine;

(4) That the oil used for lubrication in the engine is not diluted; and (5) That the vapors supplied from the vaporizer and passing to the engine instead of diluting the lubricating medium tend to supply a certain amount of lubrication as well as supplying the fuel vaporous form for operating the engine.

In connection with the system hereof it will be noted that the means for supplying fuel oil to the vaporizer must deliver it at sufficient positive pressure to insure its delivery into the vaporizer even against such superatmospheric pressure condition as may exist therein incident to the nominal operation of the system.

It will also be noted that the combustible mixture delivered from the condensate-air mixing element 130 or from the vapor-air mixing element 128 or from both of said mixing elements is passed from the atomizing means or carbureter V embodying said mixing elements under the influence of the suction effect of the engine EG into the intake manifold of the engine from which it is distributed and ultimately delivered into the respective cylinders of the engine. The suction line 56 leading from the condenser and provided for conveying cooled vapors from the condenser and for delivering the same into the carbureter or what is the same thing as far as the functioning of the suction line is concerned into the intake manifold of the engine is under the suction influence of the engine. Thusly, the cooled vapors or gases are conveyed and employed as engine fuel. With respect to this pipe line 56 the engine as it operates functions as a pumping means for sucking, if a suction influence is necessary, vapors from the auxiliary vapor pipe line 59 into the condenser and for sucking the cooled vapors which have lost certain condensible constituents formerly therein from the condenser and ultimately into the engine. The diagrammatic Fig. 13 clearly indicates the connection whereby all of the foregoing features of the system are brought into operative association in the system with which the engine EG is employed, or of which the engine constitutes a part.

In said Fig. 13 there is indicated a manner whereby hot exhaust gases from the engine are supplied to the vaporizer for supplying through or from a heat-transfer means that amount of sensible heat requisite for effecting the conversion of the liquid hydrocarbon fuel into vaporous form with all of the heat producing values that existed in the liquid fuel prior to the conversion from liquid into vaporous form.

Having particularly described and ascertained the nature of the invention hereof and the manner in which the same is to be performed that which is claimed is:

1. A vaporizer for liquid hydrocarbon fuel such as crude petroleum, comprising in combination an upper vaporizing chamber; a lower vaporizing chamber; a throat member affording communicating passageway between the lower interior portion of the upper chamber and the upper interior portion of the lower chamber; means for delivering liquid-fuel to be vaporized into said upper chamber; a set of spreading rolls within the upper chamber; a set of crushing rolls within the lower chamber; each of said chambers having a floor portion providing an annular surface over and along which there function rolls of the set therein; actuating means for rolling said rolls along the annular surfaces to which they correspond; casing means associated with and surrounding said vaporizing chambers and providing an upper outer chamber for gases contacting the exterior of said upper vaporizing chamber, a lower outer chamber for gases contacting the exterior of said lower vaporizing chamber and a tubular conduit providing a gas flow passageway between said outer chambers; means for passing hot gases into one of said outer chambers; means for passing cooled gases from one of said outer chambers; means for passing solid residues from a lower portion of the lower vaporizing chamber while minimizing the outward passage of vapors from the interior of the vaporizer incident to such transfer; and means for passing resulting vaporized fuel from the upper vaporizing chamber to the exterior of the vaporizer.

2. A vaporizer according to claim 1 having a heating chamber functionally disposed between said vaporizing chambers; a heating element functionable in said heating chamber; a thermostat containing chamber functionally disposed between said vaporizing chambers; and a thermostat element disposed within the last mentioned chamber and provided for thermostatically controlling the operative movement of a member disposed outside of the vaporizer.

3. A vaporizer according to claim 1, in which the means for actuating the rolls includes a shaft and spider for actuating the rolls in the upper vaporizing chamber; another shaft and spider thereupon for actuating the rolls in the lower vaporizing chamber; and means for simultaneously actuating said shafts.

4. A vaporizer according to claim 1 in which the means for actuating the rolls includes a shaft and a spider thereupon for actuating the rolls in the upper vaporizing chamber; another shaft out of line with the first shaft and a spider thereupon for actuating the rolls in the lower vaporizing chamber; and power actuated gear mechanism for simultaneously actuating said shafts.

5. A vaporizer according to claim 1 having electrical means for initially heating the upper vaporizing chamber and a valve in the tubular conduit between the outer chambers.

6. A vaporizer for liquid fuel comprising in combination a vaporizing chamber having a roof, a marginal wall and a floor having an annular fuel-supporting surface; fuel-spreading rolls within said chamber and operable along said annular surface; actuating means for rolling said rolls along said surface; means for supplying liquid hydrocarbon fuel within said chamber for distribution by said rolls over said annular surface; an outside casing surrounding the vaporizing chamber and providing a gas-receiving space therein for hot gases contacting the exterior of said vaporizing chamber; means for supplying hot gases into said gas-receiving space; means for passing cooled gases from said gas-receiving space; means for conducting vaporized fuel from said chamber; and means for passing said residues from the interior of the chamber to the exterior thereof while minimizing the entrance of outside air thereinto.

7. A vaporizer as defined in and by claim 6, having electrical means for initially heating the vaporizing chamber.

8. A vaporizer as defined in or by claim 6, having a mixing chamber in communication with the vaporizing chamber, agitating members for effecting an intimate commingling and mixing of vapors within the mixing chamber and means for actuating said agitating members; the means for passing vaporized fuel from the vaporizing chamber embodying the mixing chamber and the pipe leading therefrom.

9. A vaporizer according to claim 6, in which there is a shaft; a spider connected thereto and turnable by said shaft, which said spider provides outwardly-extending axial members on which said rolls are rotatably mounted; mechanical mixing means disposed in the path of the vaporized fuel conducted from said chamber and power means outside of said vaporizer; and means motivated by the latter for turning said shaft, and for actuating said mixing means.

10. A vaporizer according to claim 6, having a heating chamber proximate the vaporizing chamber; resistance wiring in said heating chamber serving as an electrical heating element; means providing an electric circuit in which said heating element is included; an electric switch for opening and closing said circuit; a thermostatic chamber proximate the vaporizing chamber, a thermostatic member in said thermostatic chamber and operatively connected for controlling the opening and closing of said electric switch.

11. A liquid-fuel vaporizer comprising in combination a vaporizing chamber having a roof, a marginal wall and a floor providing an annular supporting surface of depressed cross-section; rolls within said chamber having surface configuration matching said surface of depressed cross-section and operable over and along said annular surface; actuating means for rolling said rolls along said annular surface; an outside casing surrounding the vaporizing chamber and providing a holding space therein for receiving hot gases contacting the exterior of said vaporizing chamber; means for supplying hot gases into said holding space; means for passing cooled gases from said holding space; means for conducting fuel into said chamber for vaporization therein; means for passing solid residues from the interior of said vaporizing chamber to the exterior thereof while minimizing the entrance of outside air into the vaporizing chamber; and means for conducting vaporized fuel products from said chamber.

12. A vaporizer for liquid hydrocarbon fuel such as crude petroleum and comprising in combination a vaporizing chamber; a shaft extending from the exterior into the interior of said chamber; means outside of said chamber for imparting angular turning movement to said shaft about the axis thereof; spider means within said chamber movable by and with said shaft and providing an axial member extending laterally with respect to said shaft; a roll turnable on and relative to said axial member while at the same time having movement in an orbital path about the axis of said shaft as the latter turns; said vaporizing chamber having a roof, a marginal wall and a floor, the latter of which provides a fuel supporting surface over and along which said roll operates; an outer chamber surrounding the vaporizing chamber and providing therein gas-receiving space for holding gas in direct contact with the exterior of the vaporizing chamber; hot gas upflow means leading to the gas-receiving space within the outer chamber; a cold gas outflow means leading from the gas-receiving space within the outer chamber; means for delivering fuel to be converted into vaporous form into said vaporizing chamber; means for passing the resulting vaporous fuel from the interior of the vaporizing chamber; and means for passing solid residue from the interior of the chambered body structure to the exterior thereof while minimizing the escape therethrough of vaporous fuel from within said vaporizing chamber.

LOVELL LANDERS, Jr.